(12) United States Patent
Lloyd et al.

(10) Patent No.: US 12,724,871 B2
(45) Date of Patent: Sep. 1, 2026

(54) COMPUTER SYSTEM AND METHOD FOR SECURE PASSWORD RESET OF PASSWORD PROTECTED DEVICES

(71) Applicant: Schneider Electric USA, Inc., Andover, MA (US)

(72) Inventors: Chad Andrew Lloyd, Andover, MA (US); Gregg Reavis, Andover, MA (US); Michael William Pyle, Hermitage, TN (US)

(73) Assignee: SCHNEIDER ELECTRIC USA, INC., Foxboro (MA)

( * ) Notice: Subject to any disclaimer, the term of this patent is extended or adjusted under 35 U.S.C. 154(b) by 206 days.

(21) Appl. No.: 18/635,701

(22) Filed: Apr. 15, 2024

(65) Prior Publication Data

US 2025/0322062 A1 Oct. 16, 2025

(51) Int. Cl.
*G06F 21/46* (2013.01)

(52) U.S. Cl.
CPC .................................... *G06F 21/46* (2013.01)

(58) Field of Classification Search
CPC .. G06F 21/46; G06F 2221/2131; G06F 21/45; H04L 9/3228; H04L 9/3239; H04L 63/0876
See application file for complete search history.

(56) References Cited

U.S. PATENT DOCUMENTS 9,355,233 B1 * 5/2016 Chen .................... H04L 9/0891
12,108,253 B2 * 10/2024 Falk ...................... G06F 21/45
2016/0352702 A1 * 12/2016 Gallant .................. G06F 21/31
2017/0093805 A1 * 3/2017 Proulx .................. H04L 9/0863
2023/0060803 A1 * 3/2023 Moon .................. H04L 9/3228

FOREIGN PATENT DOCUMENTS

CN 111355708 A 6/2020
WO WO-2019164935 A1 * 8/2019 ............ G06F 21/57

OTHER PUBLICATIONS

Extended European Search Report for European Patent Application No. EP25170503.4, dated Jun. 16, 2026.

* cited by examiner

*Primary Examiner* — James R Turchen
(74) *Attorney, Agent, or Firm* — Quinn IP Law

(57) ABSTRACT

A computer-implemented method and system for providing secure password reset functionality for a password protected device. Receiving, in a password reset computer server, is a request code for enabling password reset functionality for the password protected device. The request code is parsed to identify the password protected device for generating a recovery string including at least metadata and a unique identifier associated with the password protected device. A first hash value representation of the recovery string is generated for the password protected device. The first hash value is then compared to a second hash value, which second hash value is generated by another computer device and is representative of a second recovery string that includes at least the metadata and the unique identifier associated with the password protected device. Password reset functionality for the password protected device is enabled when the first and second hash values match.

20 Claims, 7 Drawing Sheets

COMPUTER SYSTEM AND METHOD FOR SECURE PASSWORD RESET OF PASSWORD PROTECTED DEVICES

BACKGROUND

1. Field

The disclosed embodiments generally relate to a computer-implemented method and system for providing password reset management, and more particularly, to a secure process for resetting passwords in critical devices that may not incur interruption of its power operation during a password reset process.

2. Description of Related Art

Many power and critical devices have a need for password reset operations, yet they are placed in situations where a traditional password reset is not acceptable (they may not be power cycled, or factory reset). The issue of securely resetting a password for critical system devices is frequently problematic. For instance, many of these password protected devices are not connected to the Internet, making it necessary to support secure reset operations in a remote and offline way. Additionally, password protected devices are often used in critical system operations and thus the system user often cannot tolerate a power cycle, or a forced factory reset, of a device configuration to reset a device's password. Thus, there is exists a need to provide an alternative and improved system and method for securely resetting passwords of critical password protected devices/components.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect the disclosed embodiments relate to a computer-implemented secure password reset system and process for providing a secure method for resetting a device's password for restoring access to a system without resulting in power cycling or other types of system downtime. Preferably, the process consists of two stages, namely enrollment and recovery. The enrollment and recovery processes both preferably use a PC-based application configured and operative to act as an intermediary between compatible password protected devices and a password recovery system. In certain illustrated embodiments, to securely reset a password on a device, the device is first preferably authenticated (to ensure that it is the correct device) (e.g., a device serial number and a pre-shared salt may be used for this authentication). Additionally, the user associated with the device is authenticated (e.g., to ensure that the correct user is recovering the password). Additionally, the user seeking password reset of a device is first to be authenticated, which may include logging into the password recovery system (e.g., a software module on a portable computer device) for providing valid login credentials.

In further, optional aspects, disclosed is a computer-implemented method and system for providing secure password reset functionality for a password protected device. Receiving, in a password reset computer server, is a request code for enabling password reset functionality for the password protected device. The request code is parsed to identify the password protected device for generating a recovery string including at least metadata and a unique identifier associated with the password protected device. A first hash value is generated that is representation of the recovery string for the password protected device. The first hash value is compared to a second hash value wherein the second hash value is generated by another computer device and is representative of a second recovery string including at least the metadata and the unique identifier associated with the password protected device. Password reset functionality for the password protected device is enabled when the first and second hash values match.

BRIEF DESCRIPTION OF THE DRAWINGS

So that those skilled in the art to which the subject disclosure appertains will readily understand how to make and use the devices and methods of the subject disclosure without undue experimentation, preferred illustrated embodiments thereof will be described in detail herein below with reference to certain figures, wherein.

DETAILED DESCRIPTION OF CERTAIN EMBODIMENTS

Figure 1:
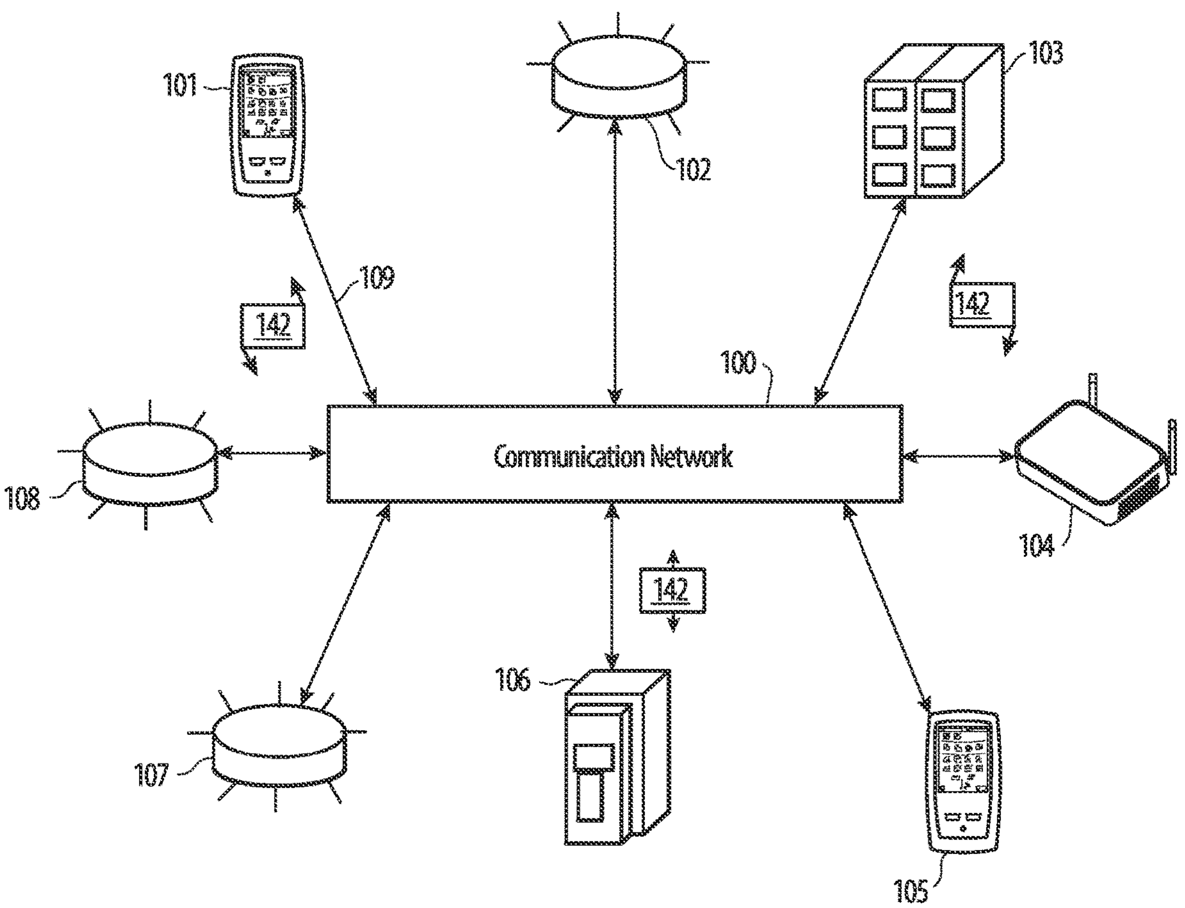
FIG. 1 illustrates an example communication network utilized with one or more of the illustrated embodiments.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program in accordance with the illustrated embodiments.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented. It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, password management devices 103, smart phone devices 105, password reset system/server (e.g., a computer server) 106, routers 107, switches 108, databases, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the illustrated embodiments may be embodied as a system, method or computer program product. Accordingly, aspects of the illustrated embodiments may take the form of an entirely hardware embodiment, an entirely software embodiment (including firmware, resident software, micro-code, etc.) or an embodiment combining software and hardware aspects that may all generally be referred to herein as a "device", "apparatus", "module" or "system." Furthermore, aspects of the illustrated embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrated embodiments are described below with reference to flowchart illustrations and/or block diagrams of methods, apparatus (systems) and computer program products according to the illustrated embodiments. It will be understood that each block of the flowchart illustrations and/or block diagrams, and combinations of blocks in the flowchart illustrations and/or block diagrams, can be implemented by computer program instructions. These computer program instructions may be provided to a processor of a computer device, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium generate and maintain an inventory asset database including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
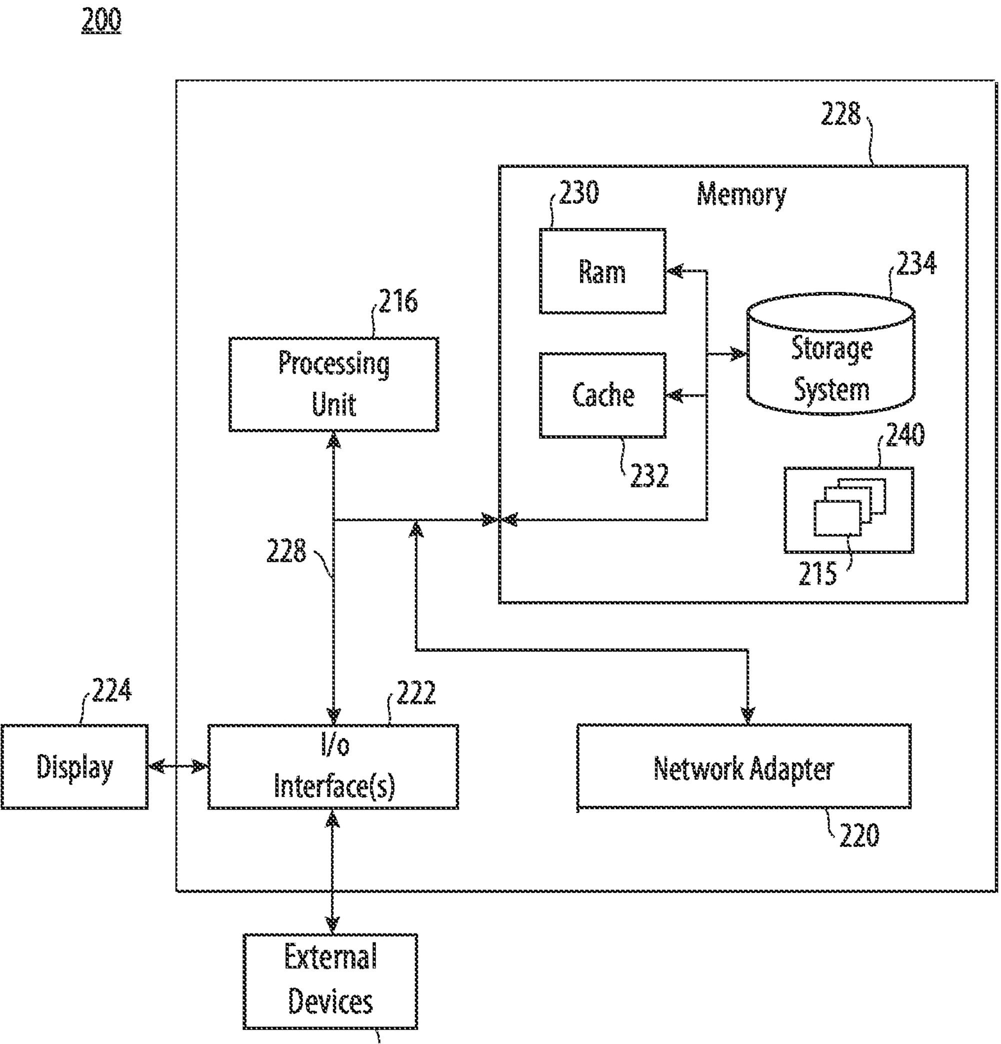
FIG. 2 illustrates an example network device/node utilized with one or more of the illustrated embodiments.

FIG. 2 is a schematic block diagram of an example network computing device 200 (e.g., password management device 103, password reset system/server 106, etc.) that may be used (or components thereof) with one or more embodiments described herein (e.g., as one of the nodes shown in the network 100) for providing a computer-implemented secure password reset system and process for providing a secure method for resetting a device's password for restoring access to a system without resulting in device power cycling or other types of system downtime. As explained above, in different embodiments these various devices are configured to communicate with each other in any suitable way, such as, for example, via communication network 100.

Device 200 is intended to represent any type of computer system capable of carrying out the teachings of various illustrated embodiments. Device 200 is only one example of a suitable system and is not intended to suggest any limitation as to the scope of use or functionality of the illustrated embodiments described herein.

It is to be understood and appreciated that computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, network PCs, minicomputer systems, and distributed data processing environments that include any of the above systems or devices, and the like. Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network 100. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random-access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules (240) that are configured to carry out the functions of embodiments of illustrated embodiments such as for providing a secure method for resetting a device's password for restoring access to a system without resulting in device power cycling or other types of system downtime.

Program/utility 240, having a set (at least one) of program modules 215, such as an asset inventory module, may be stored in memory 228 by way of example, and not limitation, as well as an operating system, one or more application programs, other program modules, and program data. Each of the operating systems, one or more application programs, other program modules, and program data or some combination thereof, may include an implementation of a networking environment. Program modules 215 generally carry out the functions and/or methodologies of the illustrated embodiments as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which the below described illustrated embodiments may be implemented. FIGS. 1 and 2 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
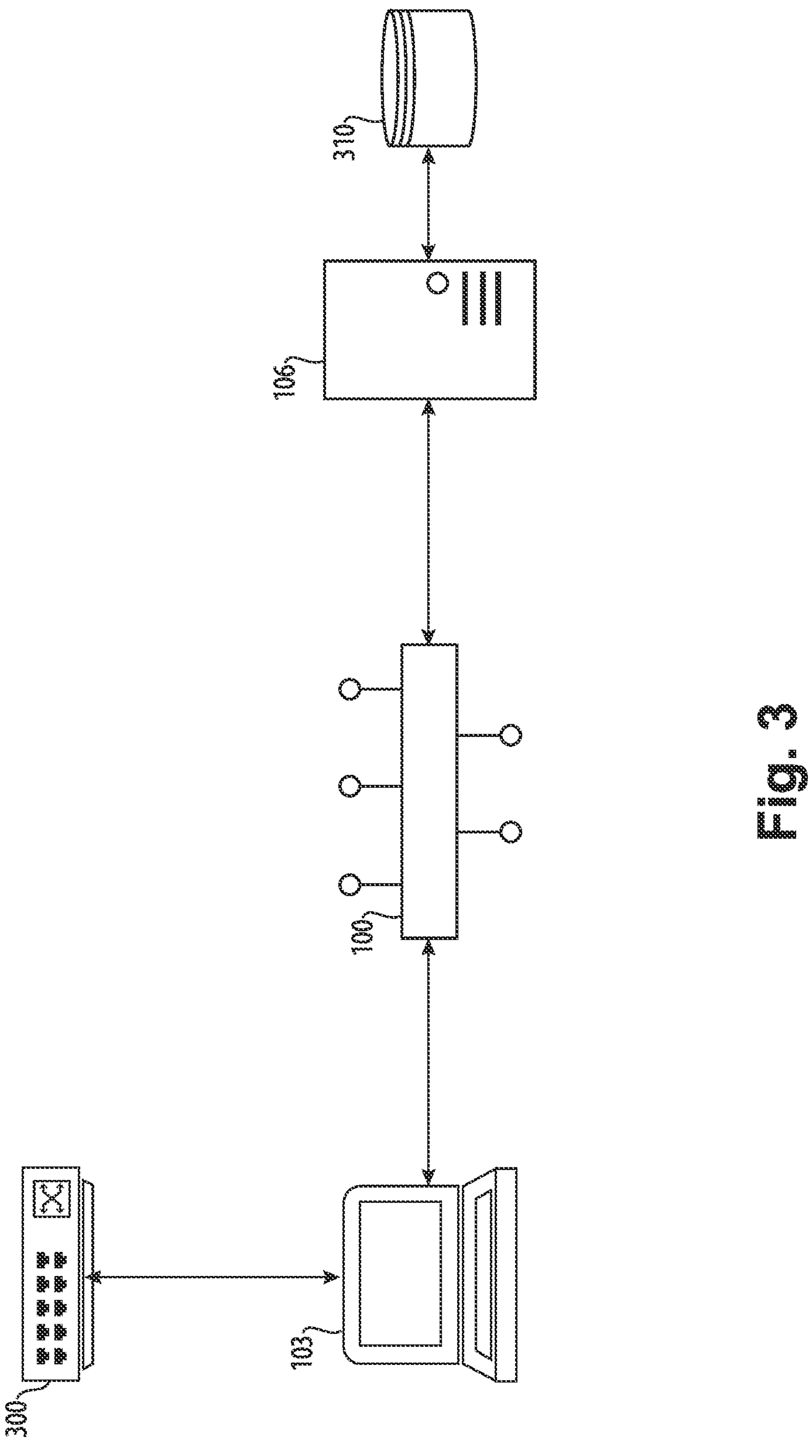
FIG. 3 is an exemplary network diagram depicting a password reset system in accordance with the illustrated embodiments.

With the exemplary communication network 100 (FIG. 1) and computing device 200 (FIG. 2) being generally shown and discussed above, description of certain illustrated embodiments will now be provided. It is to be understood and appreciated that exemplary embodiments implementing one or more components of FIGS. 1-7 relate to a computer-implemented secure password reset system and process for providing a secure method for resetting a device's password for restoring access to a system without resulting in device power cycling or other types of system downtime. With reference now to FIG. 3, shown is a simplified exemplary embodiment depicting a password management system 350 consisting of a password management device 103 configured and operative to communicatively couple to a password protected device 300 for resetting the device's 300 password for restoring access to the device 300 and/or a system the device 300 is a component of without resulting in device power cycling or other types of system downtime. It is to be appreciated and understood the password protected device 300, in accordance with the illustrated embodiments encompasses numerous types of password protected devices, and in accordance with the illustrated embodiments preferably encompasses a native protocol-compatible device (e.g., a MODBUS compatible device), such as circuit breaker component device that is a component of an overall system. For instance, and as known by one skilled in the art, Modbus is a serial communication protocol for transmitting information between electronic devices. However, it is to be understood and appreciated, the password protected device 300 in accordance with the illustrated embodiments is not to be understood to be limited to such as MODBUS-compatible device, as it may encompass any suitable password protected device 300 that is capable of communicatively coupling to the password management device 103 for enabling password reset functionality in accordance with the illustrated embodiments.

With regard to the password management device 103, it is preferably a portable computer device (e.g., a PC-based laptop device) configured and operative (e.g., via a Password Recovery Utility, or Programmable Real-Time Unit (PRU) (240)) to act as an intermediary between the password protected device 103 and a password recovery system/server 106. As shown in FIG. 3, the password management device 103 is configured and operative to communicatively couple to a remotely located password reset system/server 106 (e.g., a computer server) via a communication network 100. The communication network 100 preferably includes (but is not limited to) connection security, such as: TLS 1.2/HTTPS Connection; LDAP/Active Directory Authentication; Role Based Authorization (local); and Java Web Token (JWT) Bearer Token. With regard to the password reset server 106, it preferably consists of a computer web server device, which preferably is coupled to secure memory/database 310, which may include (but is not limited to) a Hardware Security Module (HSM)/Trusted Platform Module (e.g., a YubiHSM) for providing RSA private key encryption techniques. In accordance with the illustrated embodiments, the server 106 is preferably a file-based SQL server (e.g., a relational database management system (RDBMS).

As described further below with reference to FIGS. 6 and 7, the password management system 350, in accordance with the illustrated embodiments provides a secure process for resetting a password for a password protected device 300, which process preferably consists of two stages, namely enrollment (600, FIG. 6) and reset (700, FIG. 7). As described herein, the enrollment and reset processes preferably utilize a computer device 103 (e.g, a PC-based application having a Password Recovery Utility, or PRU) to act as an intermediary between compatible password protected devices 300 and a remote password reset system/server 106 (e.g., a cloud-based Password Recovery System (PRS)).

In operation, to securely reset a password on a password protected device 300, certain secured authentication steps are preferably performed, including authentication of the password protected device 300 to ensure that it is the correct device. For instance, a device 300 serial number and pre-shared salt may be used for this authentication. Further, a customer/user of a password management device 103 is preferably authenticated to ensure that the correct customer/user is recovering the password. For instance, a customer care center representative may authenticate the customer/user caller before approving an enrollment or recovery request for a password protected device 300. Additionally, the aforesaid authentication of the customer care center representative may include a customer/user of a password management device 103 logging into the password reset server 106 with valid login credentials.

Figure 4:
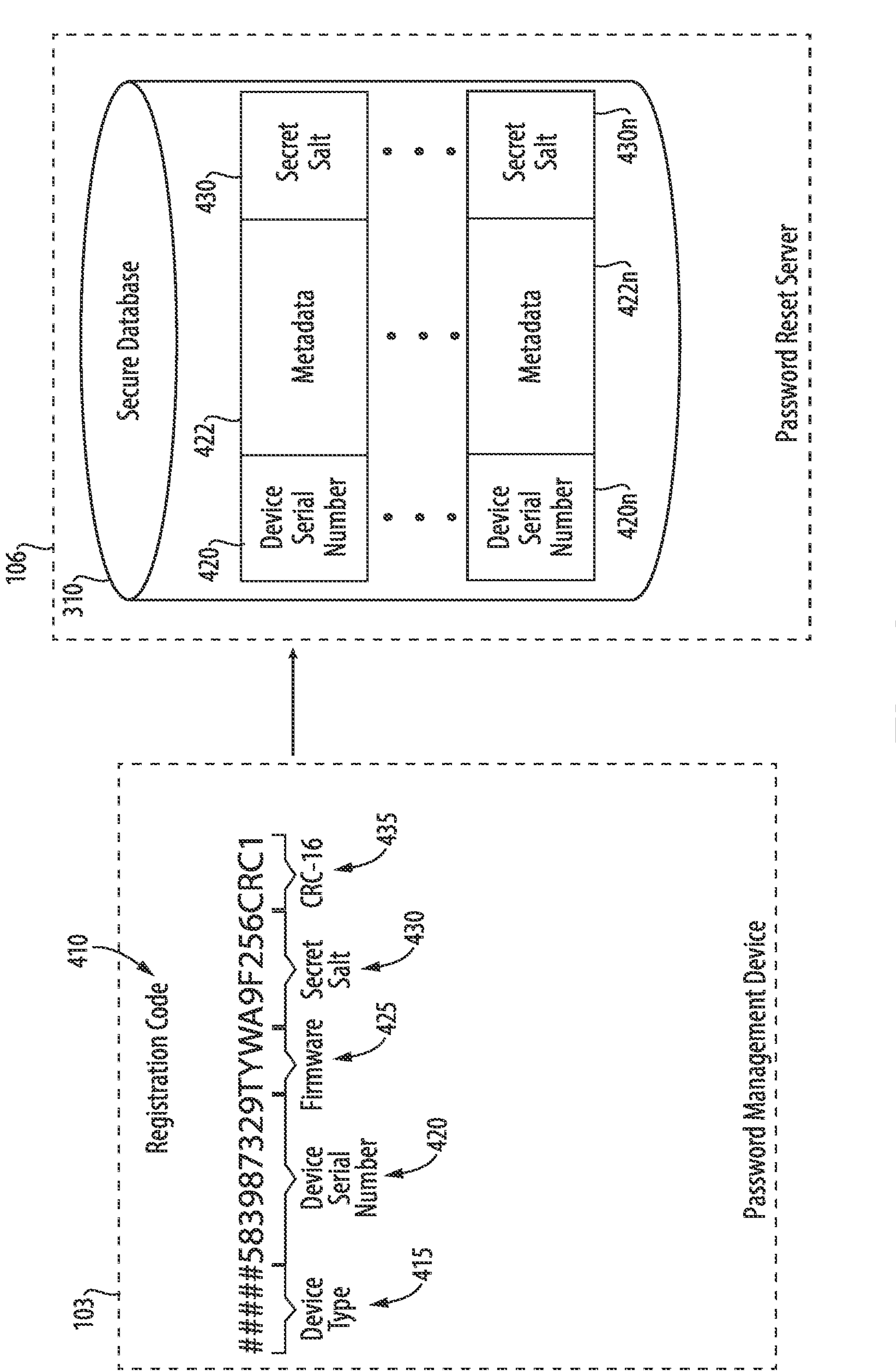
FIG. 4 depicts a diagram illustrating generation of a Registration Code for enrolling a device with the password reset system of FIG. 3 in accordance with the illustrated embodiments.

With regard now to the aforementioned enrollment stage, to participate in the password management system 350, a password protected device 300 is first preferably enrolled for use with the password management system 350. To enroll a password protected device 300, a user of a password management device 103 preferably via the PRU of device 103, communicates with the password protected device 300. The user then preferably instructs the PRU of device 103 to process the enrollment whereafter the PRU of device 103 preferably provides a confirmation code to the user. As further described below with reference to FIGS. 4 and 6, enrollment of a device 300 includes generation of a Registration Code 410, that preferably consists of a: device type 415 identifier; device serial number 420; firmware version of device 425; the device's unique code (e.g., a salt) 430; and in certain embodiments a CRC-16 (checksum) 435. In the enrollment stage, the generated Registration Code 410 is provided to the password reset server 106 which parses and indexes the Registration Code 410 as shown in FIG. 4 and described below with reference to process 600 of FIG. 6. It is to be appreciated and understood this may be done in near real-time if password management device 103 is network coupled to the password reset server 106, otherwise this step is performed by physically exchanging a file between the password management device 103 and password reset server 106 (e.g., via a USB memory stick). The user of password management device 103 then preferably contacts customer care associated with system 350 so as to provide the aforesaid confirmation code. Upon successful authentication with customer care of system 350, the enrollment of device 300 is approved. The user of device 103 then, preferably utilizing the PRU of device 103, confirms the enrollment (e.g., sending confirmation back to the device 300). The password protected device 300 is then enrolled in the password reset server 106. It is noted, a factory reset of a device 300 will require re-enrollment—this is because upon a factory reset, a password protected device 300 generates a unique code (e.g., a "secret salt") to be used for secure password recovery operations. This unique code (e.g., salt) value is preferably pseudo-randomly generated. Preferably, the unique code (e.g., a salt) value should be securely stored on the password protected device 300 (preferably via a TPM or other similar secured memory components/processes).

With regard to the aforesaid password reset stage, once a password protected device 300 has been registered/enrolled (as briefly described above), password reset for the device 300 by the password reset system 350 may then be enabled. Preferably, to reset a password, the target password protected device 300 preferably is placed in recovery mode, which may require physical access to the device 300. It is noted this differs by device type. For instance, it may involve a button sequence being performed on the password protected device 300 that is not prone to accidental activation. With regard to password protected devices 300 not having physical buttons, this may involve a specific, local communication sequence.

Once password reset mode is activated in a password protected device 300, the user of password management device 103 preferably utilizes the PRU of the password management device 103 to communicate with the password protected device 300. The user of the password management device 103 then preferably instructs the PRU of device 103 to process the password reset request whereby the PRU of device 103 provides a confirmation code to the user. As indicated above, it is to be appreciated and understood this may be done in near real-time if password management device 103 is network coupled to the password reset server 106, otherwise this step is performed by physically exchanging a file between the password management device 103 and password reset server 106 (e.g., via a USB memory stick). The user of the password management device 103 then preferably utilizes the PRU of device 103 to confirm the recovery (sending the confirmation back to the password protected device 300). Upon receipt of this confirmation, the password protected device 300 preferably resets the administrative (or other high privilege user) password to a default or blank state.

It is to be understood and appreciated that to enable password reset mode for a password protected device 300, the password protected device 300 is preferably placed in recovery/reset mode. The particular process of how a password protected device 300 enters recovery/reset mode is dependent on the device capabilities. For instance, entering recovery/reset mode may involve obscure physical device interaction (e.g., pressing two buttons at the same time, etc.).

Figure 5:
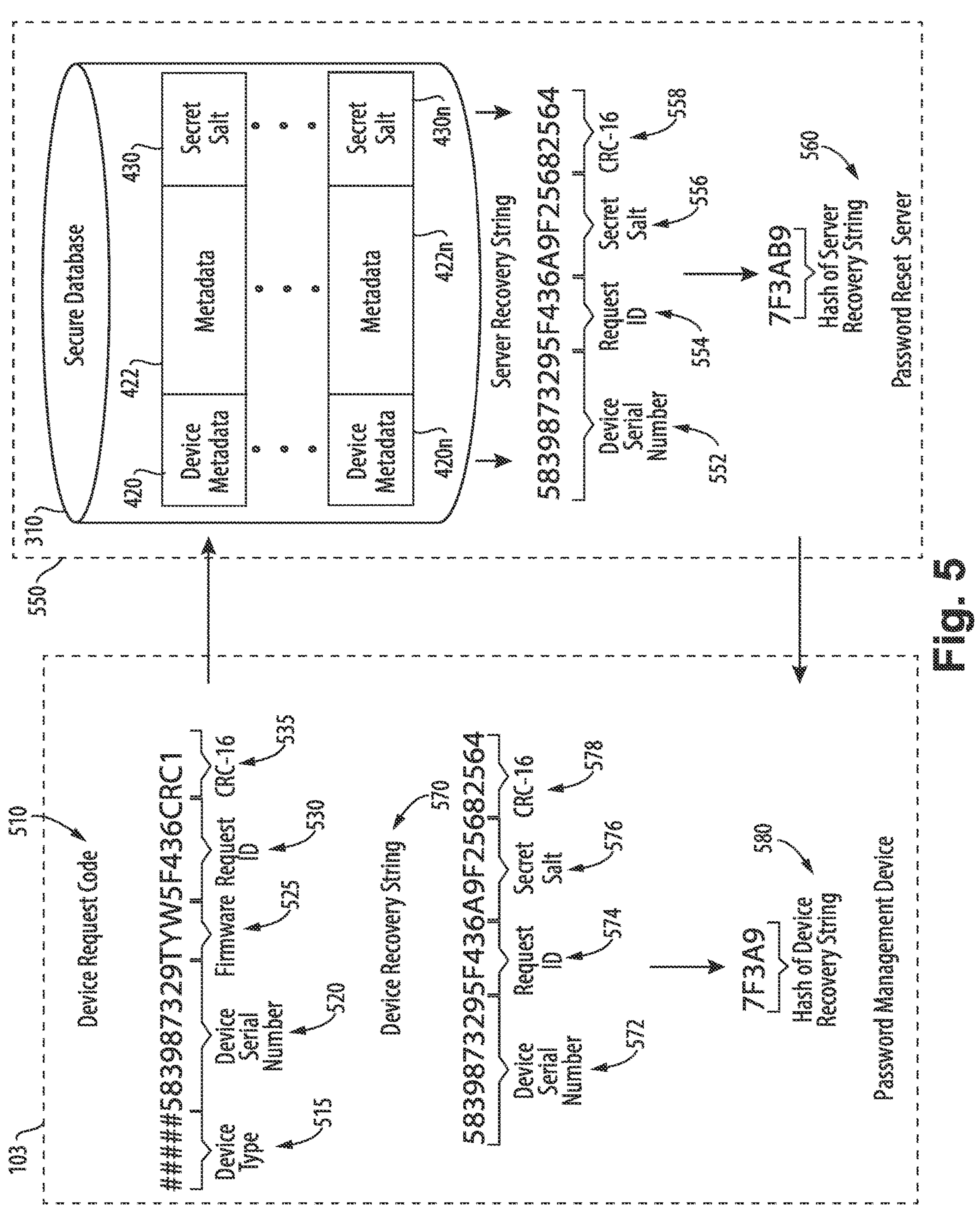
FIG. 5 depicts a diagram illustrating generation of a request Code and Recovery Strings for enabling reset of a password for a password protected device by the password reset system of FIG. 3 in accordance with the illustrated embodiments.

As further described below with reference to FIGS. 5 and 7, password reset of a device 300 by a password management device 103 includes generation of a Device Request Code 510, that preferably consists of a: device type 515 identifier; device serial number 520; firmware version of device 425; a Request ID 530 (to prevent replay attacks); and in certain embodiments a CRC-16 (checksum) 535. It is noted the Device Request Code 510 does not include the unique identifier (e.g., a salt) (430) that is associated with the device 300 and which was provided in the aforesaid Device Request Code 510 for registration of the password protected device 300 with the password management system. And as will be further described below with reference to FIGS. 5 and 7, once the password management device 103 (preferably via its PRU) has generated the recovery request code 510 that is provided to the password reset server 106, it preferably generates a Device Recovery String 570 (which includes the unique identifier 576 (e.g., a salt) that is associated with the device 300) which is then used to generate a preferably a SHA-256 hash 580 of the Device Recovery String 570. As described below, this hash 580 is then compared against a hash 560 of a Server Recovery String 550 generated by the password reset server 106 responsive to receipt of the aforesaid Device Request Code 510. It is noted the generated Server Recovery String 550, like the Device Recovery String 570, includes the unique identifier 556 (e.g., a salt) that is associated with the device 300, and which was provided to the password reset server 106 via the received Registration Code 410 associated with the password protected device 300. If the hashes 560 and 580 are equal, the password management device 103 (preferably via its PRU) enables the password protected device 300 to reset its password without resulting in device power cycling or other types of system downtime.

Figure 6:
FIG. 6 depicts a flow chart illustrating a computer process for generating a Registration Code for enrolling a device with the password reset system of FIG. 3 in accordance with the illustrated embodiments.
Figure 6:
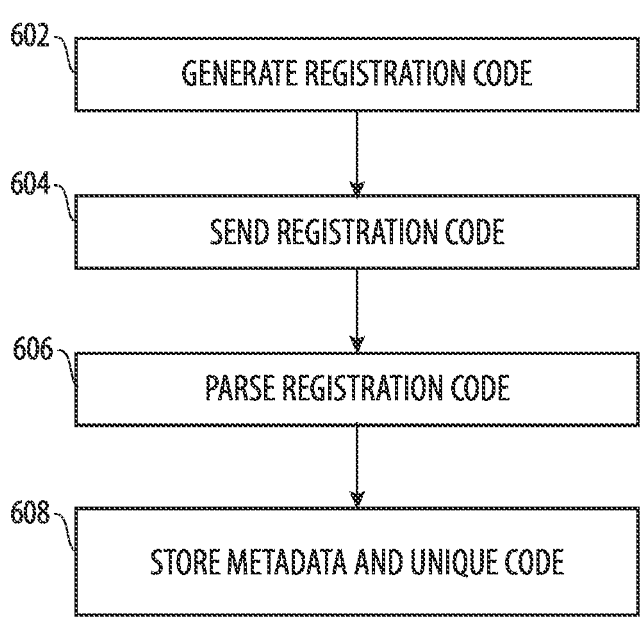
Figure 7:
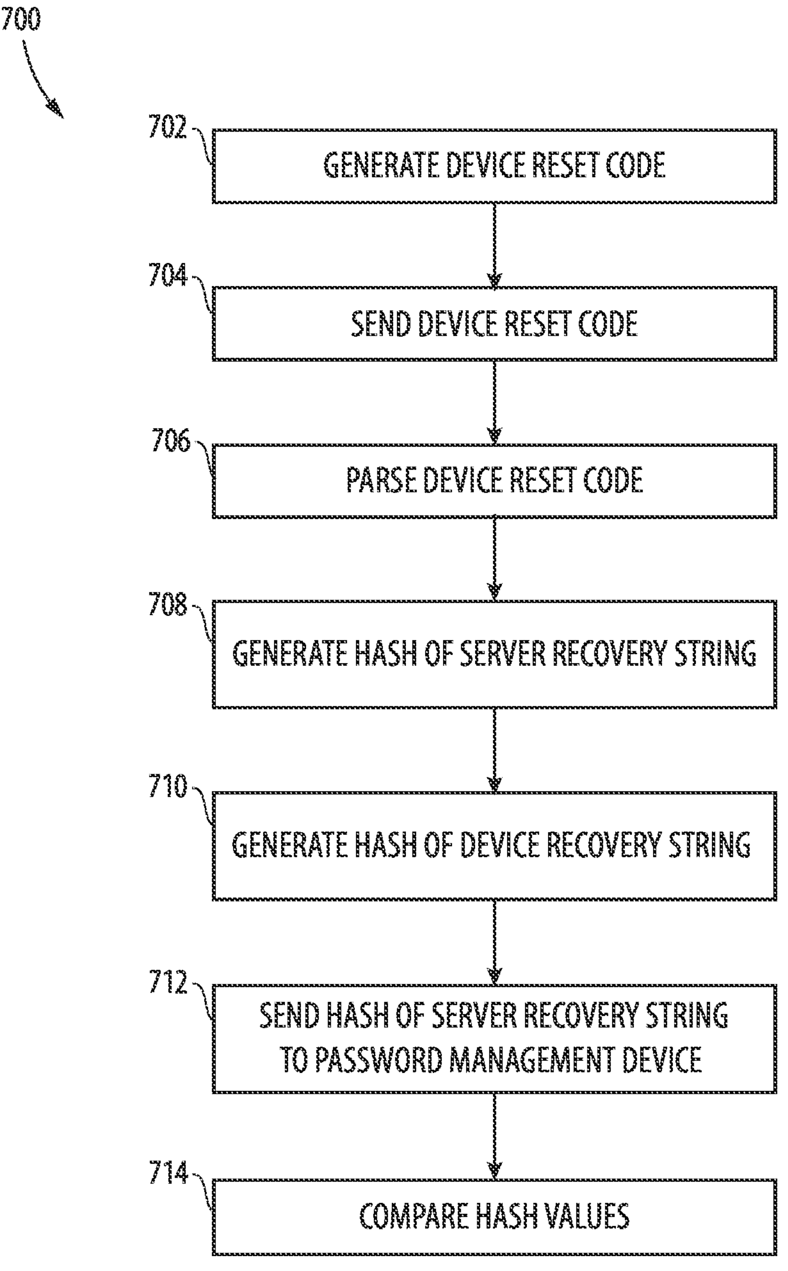
FIG. 7 depicts a flow diagram illustrating a computer process for generating a request Code and Recovery Strings for enabling reset of a password for a password protected device by the password reset system of FIG. 3 in accordance with the illustrated embodiments.

With a brief description of operation of certain illustrated embodiments provided above, and with reference now to FIGS. 4 and 6 (and with continuing reference to FIGS. 1-3), a computer-implemented process 600 for enrolling/registering a password protected device 300 with the password management system 350, and particularly its password reset server 106 is now described. Starting at step 602, a password protected device 300 is enrolled/registered with the password reset server 106 by first operatively coupling the password protected device 300 to a password management device 103 (as mentioned above, preferably via the PRU of device 103) after which the password management device 103 retrieves the unique identifier 430 (e.g., a salt, or a cryptographically complaint random string) associated with device 300 so as to generate a Registration Code 410 for the password protected device 300 which includes metadata associated with certain attributes of the password protected device 300 and the unique identifier 430 associated with the password protected device 300. As shown in the illustrated embodiment of FIG. 4, the metadata, in certain embodiments, may consist of device type 415 identifier; device serial number 420; firmware version of device 425; and in certain embodiments a CRC-16 (checksum) 435 (to facilitate further security). Once this Registration Code 410 is generated, at step 604, it is securely provided to the password reset sever 106, as mentioned above (e.g., either wirelessly via a secure communication channel 100, or by physical means (e.g., physical memory such as USB memory key). At step 606, once the Registration Code 410 is input to the password reset server 106, the password reset server 106 is operative and configured to parse the Registration Code 410 to separately identify at least the metadata (420, 422) and the unique identifier (430) associated with the password protected device 300. Next, at step 608, the parsed Registration Code 410 is stored and indexed by device 300 preferably in a secure database 310 associated with the password reset server 106. As shown in FIG. 4, the password reset server 106 is operative and configured to store a plurality (n) of Registration Codes 410 for a plurality (n) of password protected devices 300. And as mentioned above, the enrollment/registration process for a password protected device 300 may further include interaction between a user/customer of the password management device 103 with a customer service agent of the password management system 350 to preferably authenticate/verify the user/customer of password management device 103 seeking to enroll/register a password protected device 300.

With description of an enrollment/registration process 600 being provided above in accordance with certain illustrated embodiments, provided below with reference to FIGS. 5 and 7 (and with continuing reference to FIGS. 1-3), a computer-implemented process 700 for resetting the password for a password protected device 300 is now described in accordance with the certain illustrated embodiments.

Starting at step 702, when a password reset is required for a preferably enrolled/registered password protected device 300 (as described above with reference to process 600) (e.g., a password for a device 300 is lost and or not otherwise accessible), the password protected device 300 is then operatively coupled to a password management device 103 (as mentioned above, preferably via the PRU of device 103), after which the password management device 103 retrieves certain metadata from the password protected device 300 (e.g., Device Type 515, Device Serial No. 520, Firmware version 525) so as to generate a Device Request Code 510 for the password protected device 300. As shown in FIG. 5, the generated Device Request Code 510 further may preferably include a Request ID 530 (to prevent/mitigate replay attacks) and a checksum value 535 (for added security). It is to be appreciated and understood, the generated Device Request Code 510 does not include the unique identifier 430 associated with the password protected device 300. Next, at step 704, the generated Device Request Code 510 is sent from the password management device 103 to the password reset server 106, preferably via a secure communication channel 100 or via a secure memory device (e.g., a USB memory key).

At step 706, once the Device Request Code 510 is input to the password reset server 106, the password reset computer 106 is operative and configured to parse the Device Request Code 510 to retrieve the aforesaid device 300 metadata (e.g., 515, 520 and 525) so as to identify matching metadata stored in a database 310 associated with server 106 so as to identify a matching device 300 that was enrolled/registered with the password reset server 106, via process 600. If an enrolled device 300 is found in database 310, then at step 708, the password reset server 106 retrieves the unique ID (430) from the database 300 which is then used in a Server Recovery String 550 generated by the password reset server 106 that preferably includes the password protected device's metadata (e.g., Device Serial No. 552), the aforementioned Request ID 554 (included in the Device Request Code 510), the aforementioned unique ID 556 (e.g., a salt) associated with the device 300, and in certain embodiments a check-sum value 558. Once this Server Recovery String 550 for the Device Request Code 510 is generated, the password reset server 106 then generates a hash 560 of the Server Recovery String 510.

At step 710, the password management device 103 generates a Device Recovery String 570 that preferably includes the password protected device's metadata (e.g., Device Serial No. 552), the aforementioned Request ID 574 (included in the Device Request Code 510), the aforementioned unique ID 576 associated with the device 300, and in certain embodiments a check-sum value 578. Once this Device Recovery String 570 for the Device Request Code 510 is generated, the password management device 103 then generates a hash 580 of the Device Recovery String 580. Proceeding to step 712, the hash 560 of the Server Recovery String 550 is then provided from the password reset server 106 (preferably via a communication channel or other suitable means) to the password management device 103. Once the hash 560 of the Server Recovery String 550 is received in the password management device 103, at step 714, the device 300 is configured and operative to compare the hash 560 of the Server Recovery String 550 with the hash 580 of the Device Recovery String 570, and if a match is determined, password reset for device 300 is enabled. Preferably, to reset a password, the target password protected device 300 preferably is placed in recovery mode, which may require physical access to the device 300. It is noted this differs by device type, but typically involves a button sequence being performed on the password protected device 300 that is not prone to accidental activation. With regard to password protected devices 300 not having physical buttons, this may involve a specific, local communication sequence.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented system for enabling secure password reset functionality for a password protected device having a unique identifier, the computer-implemented system comprising:

a computer device configured to:

generate a request code for the password protected device, the request code including at least a request identifier (ID) for the password protected device and metadata associated with certain attributes of the password protected device, whereby the request code does not include the unique identifier of the password protected device;

send the request code to a computer server located remote from the password protected device;

receive a first hash value from the computer server, wherein the first hash value is for a first recovery string including at least 1) the request ID, 2) the metadata, and 3) the unique identifier associated with the password protected device;

generate a second hash value for a second recovery string including at least the metadata and the unique identifier associated with the password protected device; and enable password reset functionality for the password protected device by determining if the first and second hash values match.

2. The computer-implemented system as recited in claim 1, wherein the computer device is operatively coupled to the password protected device.

3. The computer-implemented system as recited in claim 2, wherein the computer device is further configured to:

generate a registration code for the password protected device the registration code including at least the metadata associated with certain attributes of the password protected device and the unique identifier associated with the password protected device, wherein the metadata includes at least two or more of 1) a device type identifier of the password protected device, 2) a device serial number of the password protected device, 3) a firmware version of the password protected device, and 4) a checksum to facilitate security of the request code; and send the registration code from the computer device to the computer server, wherein the metadata and the unique identifier associated with the password protected device are stored in memory associated with the computer server for registering the password protected device with the computer server.

4. The computer-implemented system as recited in claim 3, wherein the computer device sends the request code and the registration code over a communications network to the computer server wherein the computer server comprises a password reset computer located remote from the computer device, wherein the computer device receives the first hash value from the password reset computer over the communications network, and wherein the computer device comprises a Programmable Real-Time Unit (PRU) configured to act as an intermediary for the password protected device by:

registering the password protected device with the password reset computer to enable the secure password reset functionality for the password protected device;

processing password reset requests for the password protected device; and generating the request code to reset a password for the password protected device when the password is lost or otherwise not accessible.

5. The computer-implemented system as recited in claim 4, wherein the unique identifier is a cryptographically complaint random string, wherein the checksum is a Cyclic Redundancy Check (CRC) checksum, and wherein the request ID is included in the request code to prevent or mitigate replay attacks.

6. A computer device for enabling secure password reset functionality for a password protected device having a unique identifier, the computer device comprising:

a memory configured to store instructions; and a processor coupled to the memory and configured to execute the instructions to cause the computer device to:

generate a registration code for registering the password protected device with a service for enabling the secure password reset functionality, the registration code including at least the metadata associated with certain attributes of the password protected device and the unique identifier associated with the password protected device, wherein the metadata includes three or more of 1) a device type identifier of the password protected device, 2) a serial number of the password protected device, 3) a firmware version of the password protected device, and 4) a checksum to facilitate security of the registration code;

send the registration code to a computer server associated with the service for enabling the secure password reset functionality, wherein the metadata and the unique identifier associated with the password protected device are stored in memory associated with the computer server for registering the password protected device with the service via the computer server;

generate a request code for the password protected device upon user initiation of a password reset request for the password protected device, the request code including at least the metadata associated with certain attributes of the password protected device, and whereby the request code does not include the unique identifier;

send the request code to the computer server, which is located remote from the first computer device;

receive from the computer server, a first hash value for a first recovery string the first recovery string including at least the serial number, the checksum in the metadata, and the unique identifier associated with the identified-password protected device;

generate a second hash value for a second recovery string including at least the serial number, the checksum in the metadata, and the unique identifier associated with the password protected device; and compare the first and second hash values to enable the secure password reset functionality for the password protected device if the first and second hash values match.

7. The computer device as recited in claim 6, wherein the computer device sends the request code and the registration code over a communications network to the computer server, wherein the computer server comprises a password reset computer located remote from the password protected device, and wherein the computer device receives the first hash value from the password reset computer over the communications network in response to sending the request code to the password reset computer.

8. A computer-readable medium storing instructions executable by a processor to implement a method for enabling secure password reset functionality for a password protected device having a unique identifier, the method comprising:

generating, in a first computer device operatively to coupled the password protected device, responsive to receiving a password reset request for the password protected device, a Request identifier (ID) for the password protected device and a request code for the password protected device, the request code including at least the Request ID and metadata associated with certain attributes of the password protected device, whereby the request code does not include the unique identifier associated with the password protected device;

inputting the request code to a password reset computer device;

receiving, from the password reset computer device, a first hash value for a first recovery string the first recovery string including at least the 1) the metadata, 2) the Request ID and 3) the unique identifier associated with the password protected device;

generating, in the first computer device, a second recovery string and a second hash value for the second recovery string the second recovery string including at least the 1) the metadata, 2) the Request ID and 3) the unique identifier associated with the password protected device;

comparing, in the first computer device, the first and second hash values to one another; and enabling password reset functionality for the password protected device by the first computer device contingent upon the compared-first hash value being determined to match the second hash value.

9. The computer-readable medium as recited in claim 8, wherein the password protected device is a circuit breaker component unconnected to the internet.

10. The computer-readable medium as recited in claim 8, wherein the unique identifier is a cryptographically complaint random string.

11. The computer-readable medium as recited in claim 10, wherein the cryptographically complaint random string is generated as a SALT.

12. The computer-readable medium as recited in claim 8, wherein the request code, the first recovery string, and the second recovery string each include a Cyclic Redundancy Check (CRC) checksum.

13. The computer-readable medium as recited in claim 8, wherein the metadata includes one or more of information descriptive of: 1) a serial number; 2) a device type; or 3) a firmware version associated with the password protected device.

14. The computer-readable medium as recited in claim 8, wherein the first computer device is a computer device that is separate from the password protected device.

15. The computer-readable medium as recited in claim 14, wherein the first computer device is a laptop computer device having a Programmable Real-Time Unit (PRU) configured to act as an intermediary between the password protected device and the password reset computer device.

16. The computer-readable medium implement as recited in claim 8, wherein the first computer device transmits the request code over an unsecure communications network to the password reset computer device.

17. The computer-readable medium as recited in claim 16, wherein the password reset computer device is a remotely located computer server operatively coupled to other password protected devices.

18. The computer-readable medium as recited in claim 8, wherein enabling the password reset functionality for the password protected device does not include changing the unique identifier of the password protected device.

19. The computer-readable medium as recited in claim 8, the method further including starting a timer in the first computer device upon generation of the request code, whereby the password reset functionality is not permitted upon expiration of the timer.

20. The computer-readable medium as recited in claim 8, the method further including:

generating, in the first computer device, a registration code for the password protected device including at least the metadata associated with certain attributes of the password protected device and the unique identifier associated with the password protected device; and inputting the registration code in the password reset computer device, wherein the metadata and the unique identifier associated with the password protected device are stored in memory associated with the password reset computer device for registering the password protected device with the password reset computer device.

* * * * *